Feb. 24, 1959 D. E. GRISWOLD 2,875,428
FIXED INTERVAL TIME-CONTROLLED FLUID DISTRIBUTION SYSTEM
Filed Oct. 27, 1954 5 Sheets-Sheet 3
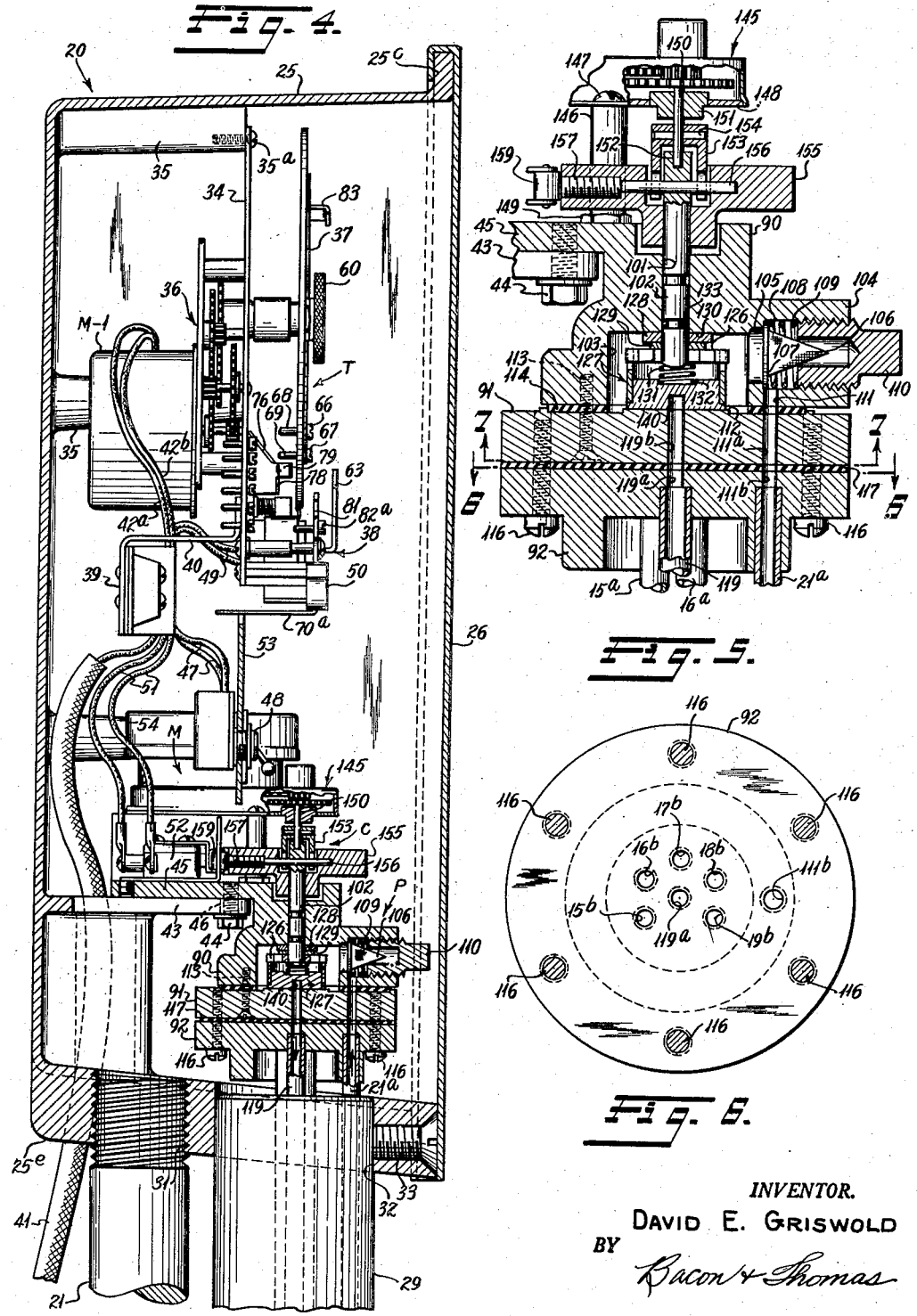
INVENTOR.
DAVID E. GRISWOLD
BY
Bacon & Thomas
ATTORNEYS Feb. 24, 1959 D. E. GRISWOLD 2,875,428
FIXED INTERVAL TIME-CONTROLLED FLUID DISTRIBUTION SYSTEM
Filed Oct. 27, 1954 5 Sheets-Sheet 4
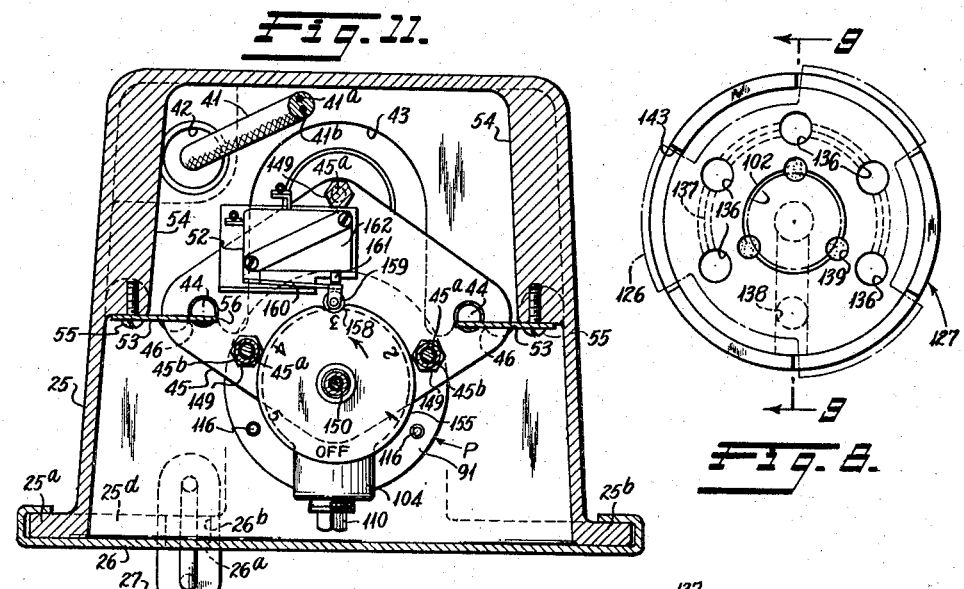
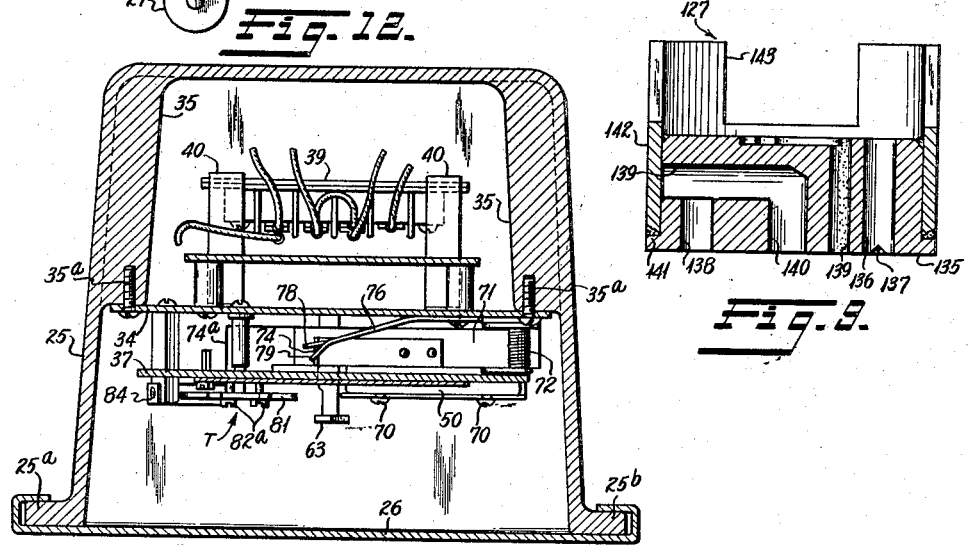
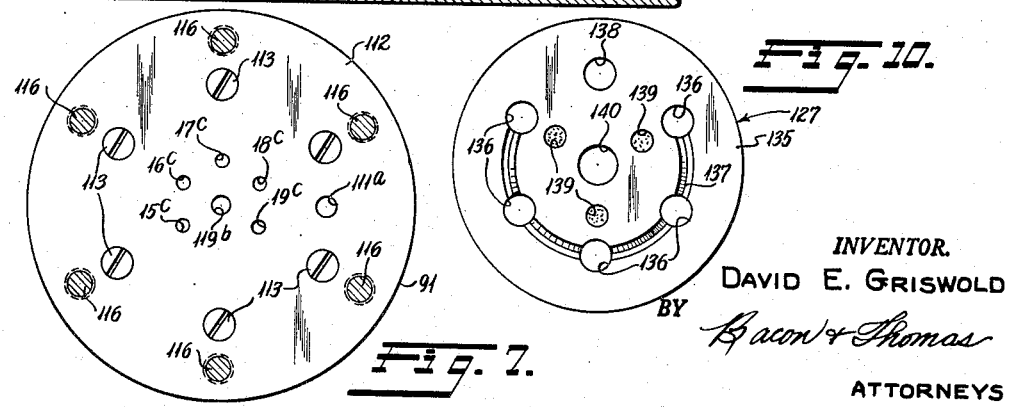
INVENTOR.
DAVID E. GRISWOLD
BY Bacon & Thomas
ATTORNEYS Feb. 24, 1959　　　D. E. GRISWOLD　　　2,875,428
FIXED INTERVAL TIME-CONTROLLED FLUID DISTRIBUTION SYSTEM
Filed Oct. 27, 1954　　　　　　　　　　　　　5 Sheets-Sheet 5
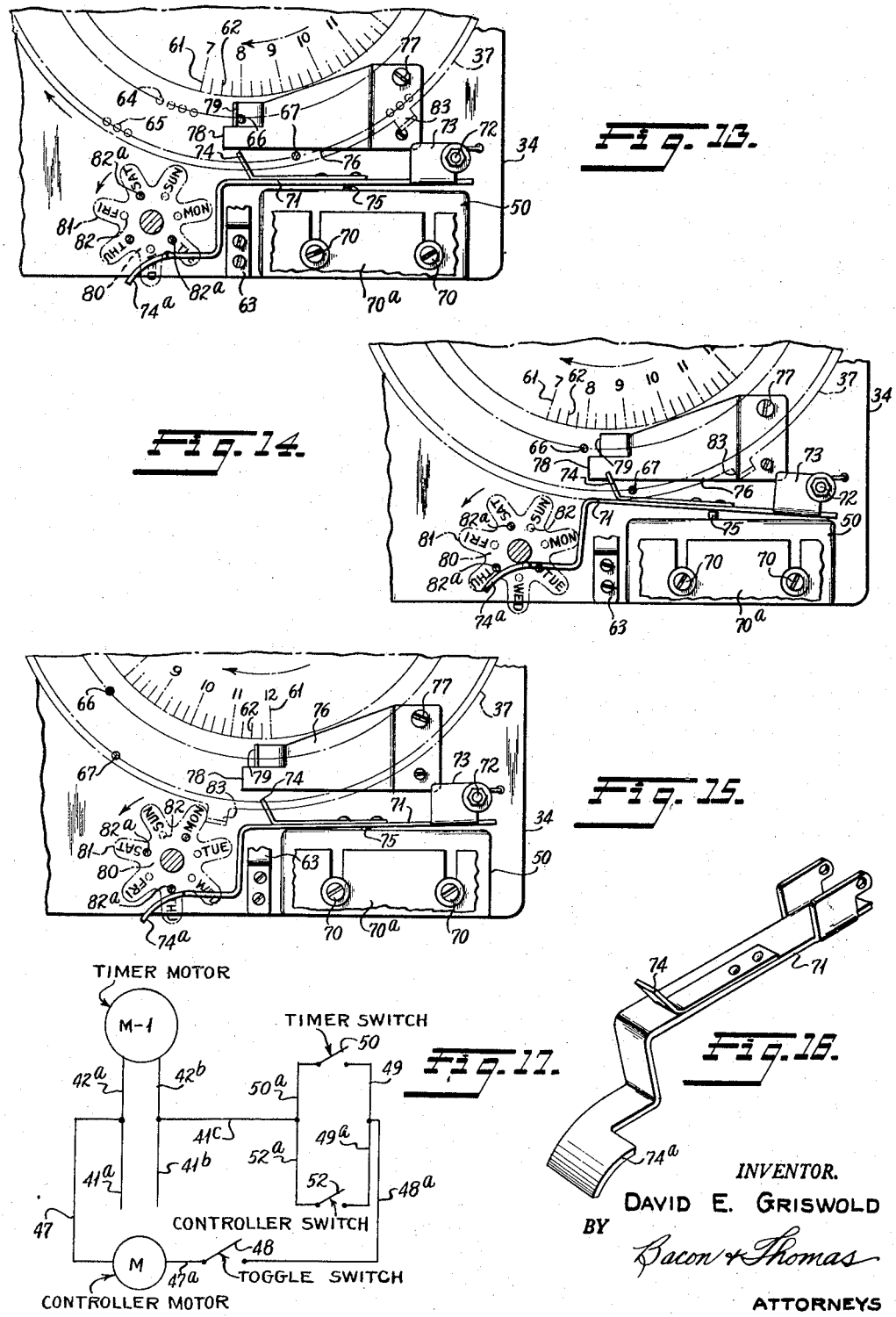
INVENTOR.
DAVID E. GRISWOLD
BY
Bacon + Thomas
ATTORNEYS

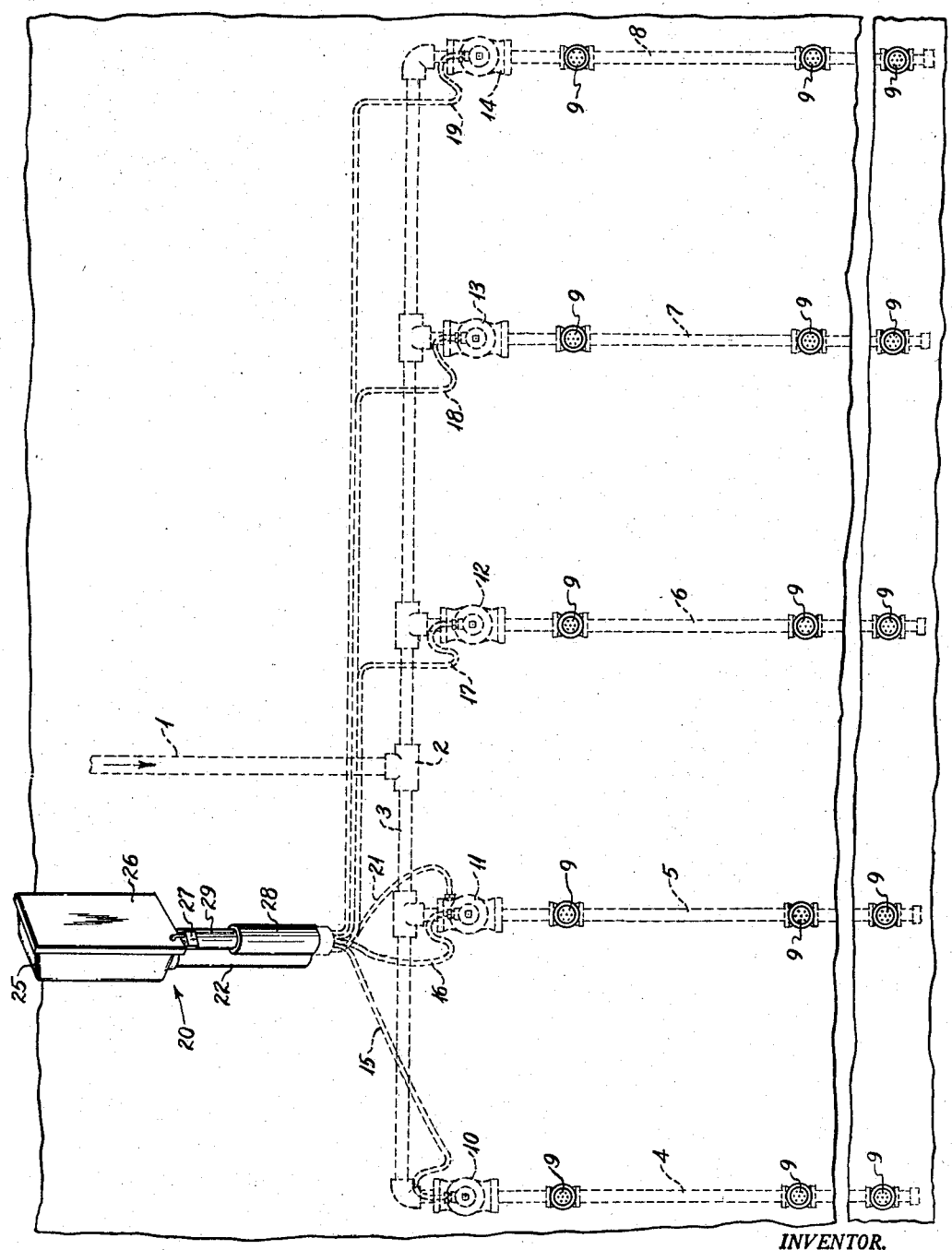

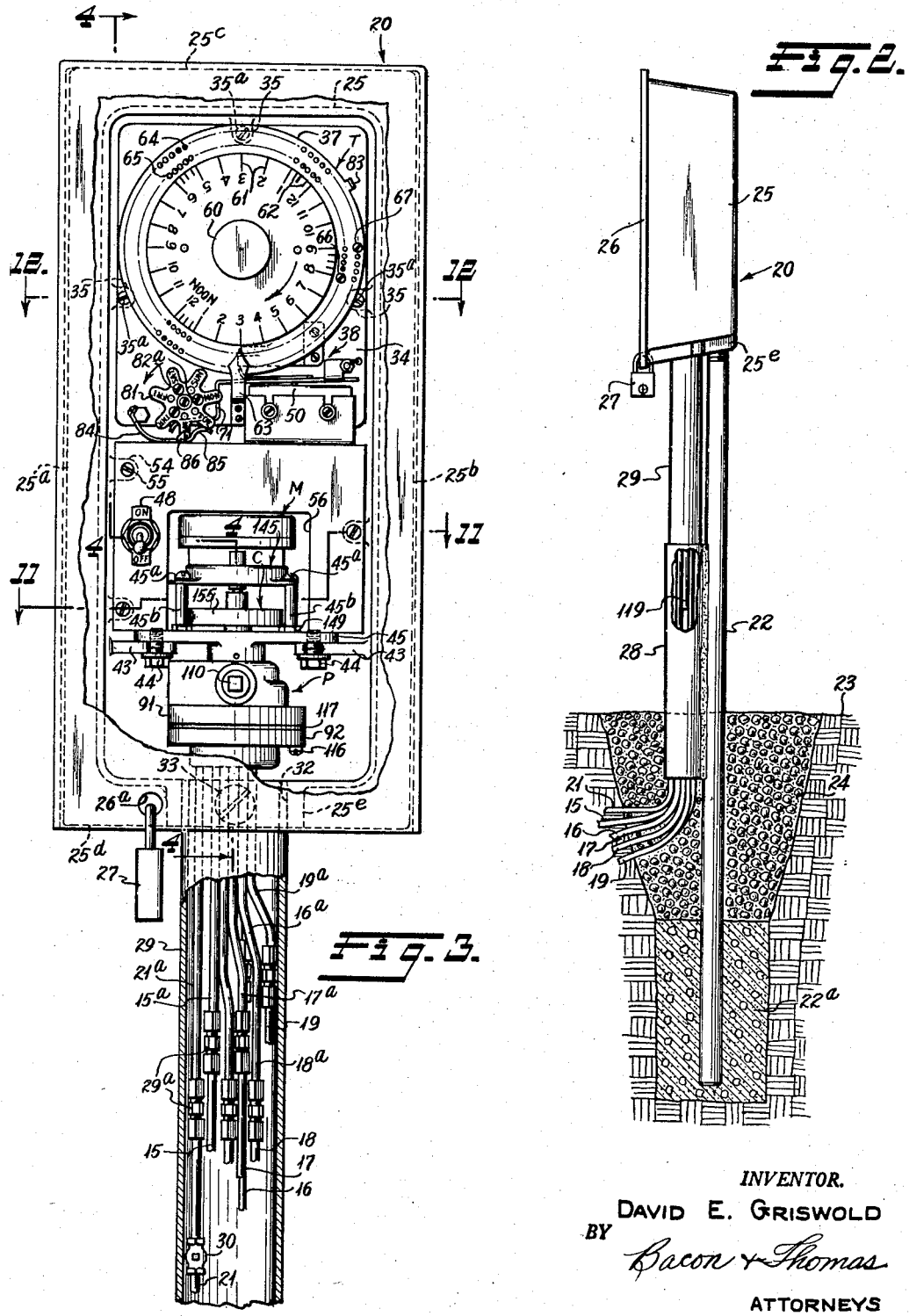

United States Patent Office

2,875,428
Patented Feb. 24, 1959

2,875,428

FIXED INTERVAL TIME-CONTROLLED FLUID DISTRIBUTION SYSTEM

David E. Griswold, San Marino, Calif.

Application October 27, 1954, Serial No. 464,989

6 Claims. (Cl. 299—25)

This invention relates to a system of fluid distribution and time-controlled valve means therefor, and particularly to an automatic sprinkler system and a control unit for controlling the sprinklers to operate at preselected times for fixed intervals of desired duration.

Automatic sprinkling systems for lawns and the like generally include sprinkler heads distributed throughout the lawn area and in many instances the lawn area to be watered is of such extent that the usual water supply pipes are unable to provide sufficient pressure and volume of flow to operate all the sprinklers simultaneously. It is customary, therefore, to arrange the sprinklers in groups, each group arranged to water a selected area and each group being supplied by a single branch or distribution conduit. The separate branches or distribution conduits are connected to the main supply line and controlled by pressure-actuated diaphragm valves that may be selectively operated to supply water to any one of the branches or distribution conduits.

The present invention relates to time-controlled means, having a rotary pilot valve associated therewith, for preselecting the times at which each distribution conduit will be supplied with water and to predetermine the length of time each distribution conduit is in operation and to thereafter shut the valve controlling that conduit and open the valve controlling another conduit. More specifically, water distribution through any given conduit may be timed for intervals of 2, 5 or 10 minutes (depending upon the selection of appropriate gearing for the pilot valve driving mechanism), for any time of the day and any day of the week. A cycle may be repeated several times without interruption, if desired, or the interval between successive cycles may be as short as fifteen minutes or as long as desired within a twenty-four hour period.

The present invention provides an automatic sprinkler control system wherein the pilot valve directly controls the operation of the valves connecting the distribution conduits to the main supply line. The pilot valve of the present invention effects distribution and control of operating fluid for each of the distribution conduit valves and is subject to control by an electric clock-driven program disc arranged to close a program switch and to energize or complete the circuit to a synchronous motor that drives the disc of the pilot valve through a suitable gear train to change the position of the disc to effect actuation of the pressure-actuated valves to provide watering of different areas in the desired sequence. The control system of the present invention also includes means which maintains the pilot valve driving mechanism in operation until completion of the cycle, once the cycle has been initiated. The particular means comprises a cam fixed to the pilot disc shaft and a cycle control switch arranged in a holding circuit including a synchronous motor for driving the pilot disc shaft. Actually, the cycle control switch is connected in the circuit in parallel with the program switch, but is operable independently of said program switch by said cam.

It is therefore the principal object of this invention to provide a fluid distribution apparatus and automatic control system therefor which will effect flow through a number of conduits in predetermined sequence and for fixed equal time intervals.

Another object of this invention is to provide an electrical circuit including a timing clock having a program disc for initiating the operation of the pilot valve of a pilot valve controlled fluid distribution system and which circuit will control the pilot valve in such manner as to require the pilot valve to remain in operation and complete a started cycle independently of the timing clock and program disc.

It is another object of this invention to provide such a control circuit characterized by the feature of automatically preventing the pilot valve from stopping before completing a cycle, irrespective of whether the program disc is set for a single cycle or more than one consecutive cycle.

Still another object of the invention resides in the provision of a fully automatic time-control system for fluid distribution apparatus that is subject to a limited manual control, whereby any given cycle may be advanced manually to omit distribution through one or more conduits, if desired.

A more specific object of the invention is to provide an automatic lawn sprinkler control system that can be set to water the lawn on selected days at a given hour and for any desired fixed time interval.

Another object of the invention is to provide an automatic pilot valve controlled sprinkler system which will indicate the position of the disc of the pilot valve and the corresponding part of the cycle of operation then taking place.

Still another object of the invention is to provide a pre-assembled sprinkler control unit adapted for outdoor installation and in which all of the elements controlling the valves in the distribution conduits are enclosed in a weather and tamper-proof housing.

Still further objects and features of the invention will become apparent from the following description taken in conjunction with accompanying drawings, wherein:

Fig. 1 is a diagrammatic view of an automatic water distribution or sprinkling system embodying the automatic control unit of the present invention;

Fig. 2 is a side elevational view of the control unit of Fig. 1 with a portion broken away for clarity of illustration and showing, in cross section, the manner in which the unit is mounted for outdoor installation and connected to the water distribution system;

Fig. 3 is a front view of the control unit with the housing cover partially broken away for clarity of illustration and showing the manner in which the timing mechanism and pilot valve are mounted in the housing;

Fig. 4 is a vertical sectional view through the control unit taken on the line 4—4 of Fig. 3;

Fig. 5 is an enlarged sectional view of the pilot valve structure and a portion of the driving mechanism therefor;

Fig. 6 is a horizontal sectional view taken on the line 6—6 of Fig. 5 showing the porting of the base of the pilot valve;

Fig. 7 is a similar view taken on the line 7—7 of Fig. 5 showing the porting of the fluid distribution member of the pilot valve;

Fig. 8 is an enlarged plan view of the pilot disc;

Fig. 9 is a sectional view through the pilot disc taken on the line 9—9 of Fig. 8;

Fig. 10 is a bottom view of the face of the pilot disc shown in Figs. 8 and 9;

Fig. 11 is a horizontal sectional view through the control unit taken on the line 11—11 of Fig. 3, particularly showing the manner in which the pilot valve is mounted in the housing and the pilot operated cam that controls the cycle switch;

Fig. 12 is a horizontal sectional view of a portion of the timing mechanism taken on the line 12—12 of Fig. 3;

Fig. 13 is an enlarged fragmentary view showing the program disc in dot-and-dash lines and illustrating the program switch actuating portion of the timing mechanism in its "off" position;

Fig. 14 is a view similar to Fig. 13, but showing the program switch-actuating portion in its "on" position;

Fig. 15 is a view similar to Fig. 13, but showing the program switch-actuating portion held in an "off" position by a pin on a holiday or calendar wheel to skip a predetermined day of the week;

Fig. 16 is a perspective view of the lever of the program switch-actuating portion of the mechanism shown in Figs. 13 to 15; and Fig. 17 is a diagram of the electrical circuit for the control mechanism.

Referring now to the drawings in detail, and in particular to Fig. 1 thereof, the control device of the invention is shown as applied to an underground sprinkling device including a main supply pipe 1 connected at one end to a suitable water supply source (not shown) and at the other end connected through a pipe-T 2 and header pipe 3 to a series of five lateral or distribution conduits designated 4, 5, 6, 7 and 8, respectively. Each of the distribution conduits 4 to 8 is provided with a series of sprinkler heads 9, which are adapted to project from the underground conduits to the surface of the area to be irrigated. The distribution pipes 4 through 8 are also provided with automatic fluid pressure operable diaphragm valves designated 10, 11, 12, 13 and 14, respectively, positioned near the connection of said conduits with the header pipe 3. The diaphragm valves 10 to 14 are of a well known type adapted to be closed by fluid-pressure above the diaphragm and to automatically open by line pressure when the fluid pressure above the diaphragm is released.

A series of tubes 15, 16, 17, 18 and 19 (Fig. 1) for operating fluid connect the valves 10 through 14, respectively, with a pilot valve P (Fig. 3) of a remote control unit, generally designated 20. It will be understood that these tubes are connected at one end thereof to the pressure chambers of the respective diaphragm valves 10 through 14 and supply operating fluid to such chambers or exhaust operating fluid therefrom in accordance with the control operations hereinafter described. An additional tube 21 is connected to the inlet side of valve 11 for supplying operating fluid at main line pressure to the pilot valve P of the control unit 20. While the line 21 is shown connected to the valve 11, it will be understood that it could be connected at any point between the valves 10-14 and the main line 1, the inlet side of the valve 11 merely being a convenient place for this connection due to its close proximity to the control unit 20 in the system illustrated.

The control unit 20, as is best shown in Fig. 2, comprises an upright or standard 22, which may be set in a mass of concrete 22a in the ground 23. A layer of crushed stone, gravel or pebbles 24 may be placed above the concrete 22a to receive and dissipate the small amount of operating fluid released from the control unit 20, in the manner described hereinafter. A housing or casing 25 is mounted on the upright 21 and is shown to be provided with a removable cover 26, which is adapted to receive a padlock 27 to prevent tampering with the control mechanism once it has been set for the desired operating sequence. As will best be seen from Figs. 4, 11 and 12, the cover 26 of the casing 25 has a groove at its top and sides and is slidably mounted upon outwardly extending side flange portions 25a and 25b of casing 25 and fits snugly at the top portion thereof around a top flange 25c. The cover 26 has an opening 26a near its lower edge that registers with a similar opening 26b in a flange 25d along the lower edge of the casing 25. The cover 26 can be readily removed from the casing 25 by removing padlock 27 and then sliding the cover upwardly.

The control lines or tubes 15 through 19 and the tube 21 for supplying operating fluid from the main supply line extend to a point above the upper end of a pipe section 28, Fig 2, which is welded to the upright 22 and extends for a small depth into the bed 24. The pipe section 28 is constructed so that it receives in telescoping relation a tubular sleeve portion 29 in order to render accessible couplings 29a for connecting tubes 15 through 19 and 21 to tubes 15a through 19a and 21a, respectively, extending from the pilot valve P, as shown in Fig. 2. A pet cock 30 for closing the supply line 21 may also be provided in this area, if desired. The bottom of casing 25 is provided with a boss 25e having a threaded opening 31, as shown in Fig. 4, into which the threaded upper end of the standard 21 is screwed. The top portion of the sleeve 29 has a sliding fit in an opening 32 in the boss 25e at the bottom portion of the casing 25 and is held therein by a set screw 33. Thus, set screw 33 may be loosened and sleeve 29 lowered into the pipe section 28 to permit initial installation or when it is necessary to cut off the operating fluid supply at pet cock 30, or disconnect any of the tubes.

The control apparatus 20, shown in assembled relation in Figs. 3 and 4, comprises the rotary pilot valve P which is driven by a synchronous, self-starting, electric motor, generally indicated at M. The operation of the motor M is controlled by an electric timing or program clock, generally indicated at T, and by a cam-operated control on the motor shaft, generally indicated at C.

The timing or program clock T, Figs. 3, 4 and 12, which may be of conventional design, has a base plate 34 mounted within the casing 25 upon inwardly extending ribs 35 by screws 35a. The clock T comprises a self starting, synchronous motor M–1, a gear train generally designated 36, a dial face or program disc 37, and switch actuating mechanism generally designated 38. A terminal bar 39 is mounted by brackets 40 to the rear of base plate 34 and suitable electrical current, say 110 volt, 60 cycle A. C., is supplied to the terminal bar 39 through a power supply cable 41, containing conductors 41a and 41b, which extends through a suitable opening 42 (Fig. 11) in the casing 25. The motor M–1 is connected to terminal bar 39 by means of leads 42a and 42b.

The pilot valve P is mounted within the casing 25 upon an inwardly projecting horizontal flange 43 by cap screws 44 which extend through notches 46 in the edge of the flange 43 and are threaded into suitable openings in a flange portion 45 of the housing of the pilot valve P. The motor M is mounted upon the flange 45 by three screws 45a which extend through spacers 45b and into threaded openings in said flange. It will be apparent that the pilot valve P and motor M can be readily removed from the mounting flange 43 by merely loosening the cap screws 44 and pulling the assembly forwardly away from the flange 43. Upon disconnecting the couplings 29a, the pilot valve P and its extending tubes 15a through 19a and 21a may then be pulled upwardly and outwardly, if it becomes necessary for any reason to remove this assembly from the casing 25.

The motor M for driving the pilot valve P is connected at one side by a lead 47 to the conductor 41a, Fig. 17, and at its other side by a lead 47a to one contact of a manually operable toggle switch 48, the other contact of which is connected by a conductor 48a to leads 49 and 49a, respectively. The lead 49 is connected with one contact of a program switch 50 in the form of a normally open micro switch adapted to be actuated by the timing mechanism of the clock T. The lead 49a is connected with one contact of a cycle control switch 52 also in the form of a normally open micro switch adapted to be actuated by the cam-control C. Leads 50a and 52a connect the other contact of the switches 50 and 52, respectively, with a wire 41c extending from the conductor 41b. The toggle switch 48 is mounted upon a plate 53, which is fixed to ribs 54 (Figs. 3 and 11), extending inwardly from the casing 25, by screws 55. The plate 53 is cut out as at 56 (Fig. 3) to accommodate the motor M and gear drive mechanism 145 for the pilot valve P. The electrical circuit will be more fully discussed in conjunction with Fig. 17 of the drawings.

The dial face or program disc 37 of the timing clock T, as shown in Fig. 3, is divided into 24 major sections indicated by lines 61 representing hours of the day, each section being further divided into four minor portions indicated by lines 62, which represent 15 minute intervals. It will be noted that the graduations 61 on the face of disc 37 are numbered 1 through 12 to represent the hours of the day from midnight up to the noon hour, and similarly numbered to represent the hours of the day from noon until midnight. A pointer 63 is provided to indicate the correct time of the day when the disc 37 is in proper adjustment. The disc 37 may be manually adjusted until the pointer 63 indicates the correct time by loosening dial lock nut 60 and turning the disc 37 by hand in a clockwise direction. The clock, as shown in Fig. 3, indicates that the time is 3 o'clock in the afternoon. In the particular clock shown, the outer marginal portion of the disc 37 is provided with spaced concentric circles each having a plurality of holes 64 and 65, respectively, equally spaced thereon and in radial alignment with the graduations indicating 15 minute intervals on the dial face. These holes are adapted to receive in threaded engagement a number of screw pins, two of which, 66 and 67, are shown mounted on the lower left hand portion of the disc 37. These screw pins have extensions 68 and 69 (Fig. 4) projecting beyond the inner face of the disc 37 adapted to trip the switch actuating mechanism 38, as will presently be described, to thereby determine the operating time of the motor M of the pilot valve P. This operating time is selected by inserting the screw pins 66 and 67 in the program disc 37 at the times chosen for respectively starting and stopping the irrigating or sprinkling operation. The pin 66 on the inner circle is adapted to close the program control switch 50 at the time indicated; whereas, the pin 67 on the outer circle of the disc permits this switch to open at a later time as indicated.

It will be understood that a number of pins 66 and 67 can be quickly and easily arranged around the disc 37 to open and close the program switch 50 in steps as frequent as 15 minutes over a period of 24 hours, an "off" operation to follow an "on" operation, or vice versa. The sequence of operations can be changed at any time but once set, will be repeated indefinitely until changed. As many time intervals of "on" and "off" periods can be selected as desried within the 24 hour period, as will be discussed more fully hereinafter.

Referring now more particularly to Figs. 12 through 16, the program control switch 50 is shown to be mounted on base plate 34 by screws 70 and is actuated by a lever arm 71 pivotally mounted on a stud 72 and constantly urged upwardly toward the position shown in Fig. 14 by a spring assembly 73. The screws 70 also hold a suitable insulating shield 70a in position around the switch 50. The arm 71, Fig. 16, is provided with an upwardly extending trip 74 near its central portion and with a rounded part 74a in its free end.

When the pilot valve P is out of operation, the arm 71 is held in the position shown in Fig. 13 by a leaf spring 76 (Figs. 4 and 13 to 15). The spring 76 is secured at one end to the base plate 34 by screws 77 and its other end is spaced from said plate and includes a portion 78, the lower edge of which is adapted to be engaged by the end of the trip 74 to hold the lever 71 in its down position to depress pin 75 and thus maintain the program switch 50 closed. As the program disc 37 turns, the inner pin 66 engages a raised portion 79 of the spring 76 and depresses the free end of the spring until the portion 78 is moved out of the path of the arm 71. This permits the arm 71 to move upwardly under the urging of the spring assembly 73 to the position shown in Fig. 14. In this position, the pin 75 is up and the program switch 50 is closed to complete the electrical circuit to the pilot valve motor M. This circuit will normally remain closed until one of the outer pins 67 on the program disc 37 engages the trip 74 and moves the arm 71 downwardly to depress the pin 75 and thus open the program switch 50. As soon as the trip 74 is moved clear of the spring 76 the free end of the spring will move outwardly away from the plate 34. Meanwhile, arm 71 will be held depressed until after the pin 67 clears the end of the trip 74, whereupon the spring assembly 73 will then urge the arm 71 upwardly into a position in which the trip 74 engages the edge of the spring portion 78, as shown in Fig. 13, thereby holding the program switch 50 open. Thus, the setting of the inner pin 66 determines the start of a watering interval; whereas, the outer pin 67 determines the end of such interval, although the pilot valve P is required to complete any started cycle of operation, as will be explained more fully hereinafter.

It will be noted that the timing mechanism is also provided with a calendar or star wheel 80 having seven radially extending arms or spokes 81 thereon, which are labeled with the legends "Sun," "Mon," etc., corresponding to the days of the week. A hole 82 is provided on the wheel 80 on a radius including the respective arms 81. These holes are left-hand threaded to receive pins 82a similar to the pins 66 and 67 of the program disc 37, whereby any number of pins up to seven may be inserted in the wheel. The function of these pins is to provide a "holiday" for any number of days of the week to be omitted from the schedule of operations. In other words, if the control mechanism is adapted to operate at certain time intervals as determined by the spacing of the pins 66 and 67 on the disc 37 and this cycle of operations is to be repeated daily except for Sunday, a pin 82a is placed in the opening associated with the spoke marked "Sun." In the drawings, 3 pins 82a are shown inserted in the holes 82 of the wheel 80 opposite "Mon," "Thur," and "Sat." Accordingly, watering on these three days will be omitted from the weekly cycle of operations. This is accomplished by the pin 82a in the opening opposite the designated day contacting the rounded tail portion 74a of the arm 71, as shown in Fig. 15, and holding it in its depressed position throughout the time represented by one day. In the position shown in Fig. 15, Thursday has been omitted from the schedule of operations. Accordingly, the pins 66 and 67 in the disc 37 will pass over the elements 74 and 79 on Thursday without effect upon the switch 50.

The calendar wheel 80 is actuated by the program disc 37. Thus a single trip element 83, Figs. 3 and 15, extending from the edge of the disc 37 is adapted to engage one of the spokes of the star wheel 80 and rotate this wheel counterclockwise one step to the next day once every 24 hours, i. e., at a time when the pointer 63 indicates twelve midnight on the dial face 37. In Fig. 15 the element 83 is in the position to move the star wheel from Thursday to Friday. A spring arm 84 (Fig. 3) having a curved tail portion 85 is adapted to fit between a pair of the arms 81 and normally retains the star wheel 80 in the proper position. The arm 84 carries a pointer 86 to indicate the current day of operation.

The pilot valve P, as shown in detail in Fig. 5, comprises three primary parts, namely: a body member 90, an intermediate or fluid distribution member 91, and a base 92, all preferably made of corrosion resistant metal. The body 90 is, of course, integral with the mounting flange 45, and is bored at 101 to receive a shaft 102. The body 90 is further provided with a pressure chamber 103 for operating fluid and with a lateral boss 104 in which is provided a radial inlet passage 105 communicating with the pressure chamber 103. Inlet passage 105 is provided with a conical screen 106 having a lip 107 which bears against a shoulder 108 provided in the body 90 and is held thereagainst by a spring 109. The spring 109 bears against lip 107 at one end thereof and against a removable plug 110 at the other end, which also permits the screen 106 to be removed for cleaning purposes.

An opening 111 for operating fluid extends from the bottom of the body 90 to the lateral inlet passage 105 and is in registry with corresponding openings 111a and 111b in the distribution member 91 and base 92, respectively, whereby operating fluid from supply conduit 21a may pass through the conical filter, and into the pressure chamber 103.

The distribution member 91 is disc-shaped and one face thereof has an annular recess providing a raised central seat 112 having a planar surface. An annular gasket 114 is disposed in the recess and provides a water-tight seal between body 90 and distribution member 91. These are secured in assembled relation by screws 113. The base 92 is secured to the intermediate member by screws 116, a gasket 117 being provided to ensure a water-tight seal between these elements. The base 92 receives the upper ends of the tubes 15a, 16a, 17a, 18a, 19a, the lower ends of which are connected to the tubes 15 through 19 from the fluid pressure operated valves 10 through 14, respectively, by the fittings 29a, as previously noted. The tubes 15a to 19a may be soldered or otherwise fixed within suitable sockets or counterbores in the bottom portion of base 92 to provide a convenient sub-assembly. In addition to the tubes from the fluid pressure operated valves, the base 92 accommodates the tube 21a, which is adapted to be connected to the supply line 21, and further accommodates one end of a drain tube 119 which is open to the atmosphere at the other end to provide a drain for the pilot valve P, as will be apparent hereinafter. It will be noted that the open end of drain tube 119 is positioned a substantial distance above ground level, as shown in Fig. 2 so that discharge therefrom is never obstructed.

As is best shown in Fig. 6, the base 92 is provided with five passages 15b, 16b, 17b, 18b and 19b spaced 60° apart and in communication with the tubes 15a through 19a, respectively. Base 92 is also provided with a central passage 119a, which communicates with drain tube 119. As shown in Fig. 7, the distribution member 91 is provided with five passages 15c, 16c, 17c, 18c and 19c which pass through the valve seat 112 and register with the openings 15b through 19b, respectively, of the base 92, and with a central passage 119b which registers with passage 119a in the base member. It will be noted that the end passages 15c and 19c are spaced apart 120° or twice the distance of the intermediate passages. It will be understood that the gasket 117 is provided with similar openings in registry with the openings in the member 91 and base 92.

The shaft 102, Fig. 5, carries at its lower end a driver 126 adapted to drive a rotatable pilot disc or member 127. Thrust washers 128 and 129 are provided between driver 126 and the top portion 130 of the pressure chamber 103. A small compression spring 131 bearing against a seat 132 in the top disc 127 and against the bottom of the drive element 126 holds the bottom of the disc 127 in engagement with the top of the seat 112 of the distribution member 91. The shaft 102 is provided with a conventional O-ring 133 to prevent leakage of pressure fluid from the chamber 103. The pilot disc 127, as is best seen in Figs. 10 through 12 comprises a body 135 having a series of five pressure ports 136 bored completely therethrough and spaced 60° apart. The ports 136 are adapted in one position of the disc 127 to register with the openings 15c through 19c, respectively, of the member 91. The pressure ports 136 are interconnected at the base of the body 135 by a shallow groove 137, which functions to permit operating pressure to be maintained on the closed valves controlled by the pilot valve P during revolution of disc 127 until these valves are connected with the drain port 119b. The body 135 is also provided with an exhaust port 138, spaced 60° from the two adjacent pressure ports 136, having an axial leg 150 which always registers with the drain port 119b of member 91. Small holes 139 are provided in the pilot disc 127 to retain a suitable lubricant for lubricating the seat 112.

The outer periphery of the body 135 of the pilot disc 127 is partially cut away as at 141 to accommodate a tight skirt portion 142 which extends upwardly therefrom. The upper portion of the skirt 142 is provided with a plurality of notches 143 adapted to receive driving arms 126a of the driver 126 of the stem assembly, as shown in dot-and-dash lines in Fig. 9.

In order to rotate the driver 126 and associated valve disc 127, the shaft 102 is connected to the motor M through gearing, generally designated at 145, Figs. 4 and 5. The motor M and gearing assembly are mounted upon the flange 45 of the pilot valve body 90 by the spacer elements 45b and screws 45a, previously referred to. Lock nuts 149 secure the screws 45a to the flange 45. The gear train 145 is provided with a shaft 150, which passes through a bushing 151 mounted in plate 148 and extends into a socket 152 in the upper end of the shaft 102. A bifurcated member 153 is secured to shaft 150 by a pin 154. Encompassing the shaft 102, between the gearing 145 and the flange 45, is a cycling control cam 155, which is fixed to the shaft 102 by a pin 156 threaded at the outer end thereof at 157. The bifurcated portion of element 153 straddles the pin 156 and thereby drives shaft 102 and the cam 155.

The shape of the cycling cam 155 is best shown in Fig. 11. This cam is provided with a single notch 158, adapted to receive, in the "off" position shown in Fig. 11, a roller element 159 of a spring arm 160 which is adapted to operate pin 161 of a cycle control switch 52. Thus, in the "off" position of the pilot valve P, wherein all five of the tubes 15 through 19 associated with the fluid operated valves 10 through 14 are connected by means of disc 127 to the source of operating fluid and are thereby held closed, the roller element 159 engages the notch 158 in the cam 155 and permits the arm 160 to open the switch 52. When the pilot valve P is actuated and the shaft 102 begins to rotate and turns the cam 155, the roller element 159 moves the arm 160 outwardly, thereby closing the micro switch 52 and keeping this switch closed until a complete revolution of the pilot disc 127 has been made and each valve 10 to 14 in the system has been opened and closed at least once in sequence. It will be seen from Fig. 11 that the cycling control cam 155 is marked with the indicia "1" through "5" spaced 60° apart and 60° from the position marked "off." These marks indicate the position of the pilot disc 127 and also indicate which of the valves 10–14 is open. In the "off" position all valves are connected to operating fluid and are closed. When numeral "1" is in the front position, the first valve 10 is opened, etc. The control cam 155 may be manually rotated to advance the revolution of shaft 102 and disc 127 if it is desired to skip one or more valves during an operating cycle.

In beginning an operation, all five pressure ports 136 register with the passages 15c through 19c and all of the tubes 15a through 19a are connected to the pressure chamber 103 to thereby close all valves 10 to 14. When the pilot disc assembly 127 is rotated clockwise through an angle of 60° four of the five passages, as for example 16c, 17c, 18c and 19c, in the distribution member 91 are in registry with four of the pressure ports 136 in the pilot disc 127, and the fifth passage 15c is connected through exhaust port 138 to the drain port 119b and thence to the atmosphere through drain tube 119. It will therefore be seen that operating fluid may be supplied to 4 of the 5 valves through the connecting tubing while one of the valves is being drained to atmosphere and is thereby permitted to open. When the pilot disc 127 is still further rotated clockwise through another 60°, a second series of four valves, including the valve first opened, will be connected to a source of operating fluid; whereas, the next valve will be connected to drain. Accordingly, one valve at a time is permitted to open while the other four valves are maintained in closed position during one complete revolution of the disc 127 on its seat 112.

Any desired sequence of valve opening and closing may be established depending on the way in which the tubes 15a through 19a from the base 92 are connected to the tubes 15 through 19 to the fluid operated valves 10 to 14. Thus, if desired, the tube connections may be shifted to permit valve 10 to open first, followed by valve 12, then valve 14, valve 11 and finally valve 13 during one revolution of the pilot disc 127.

The rate of revolution of the pilot disc 127 depends upon the gearing of the gear train 145. Suitable gear ratios which will effect one complete revolution of the pilot disc 127 in, for example, 15 minutes, 30 minutes, or 60 minutes may be used. In a cycle lasting 15 minutes, each valve 10 to 14 will be open for about 2 minutes. In a 30 minute cycle, each valve 10 to 14 will be open for about 5 minutes, and for a 60 minute cycle, each valve will be open for about 10 minutes.

The pins 66 and 67 are shown positioned on the program disc 37 (Fig. 3) to provide for a 60 minute watering interval to occur from 8 to 9 o'clock. Assuming that the gear train 145 will rotate the pilot disc 127 through one complete revolution in 60 minutes, then it will be understood that if it is desired to have such cycle repeat three times consecutively, then the outer pin 67 would have to be mounted on the program disc 37 in a position 180 minutes from the pin 66, or in alignment with the 11 o'clock graduation on the program disc. If the ratio of the gearing in the gear train 145 is selected to turn the pilot disc 127 through one revolution in 15 minutes, then the watering cycle will be repeated four times with the pins 66 and 67 set as shown in Fig. 3.

During the relatively slow revolution of the pilot disc 127 the ports 136 will be out of exact registry with the passages in the members 91 and 92 of the pilot valve for the major part of the time. However, the groove 137 in the bottom of disc 127 will provide communication between the pressure chamber 103 and all of the ports except the one last opened by alignment with the exhaust port 138. Thus, during approximately the first 45° of revolution of the pilot disc 127 from the starting position all of the valves 10 to 14 will remain closed, and the valve 10 will start to open as the exhaust port 138 moves into overlapping relation with its associated passage 15c. Hence, several minutes may elapse before the first valve opens. However, each of the remaining four valves will open in sequence for prescribed time intervals, after which all valves will again be closed at the end of the cycle.

The operation of the control apparatus will be better understood by reference to the circuit diagram of Fig. 17. It will be noted from this diagram that the time clock motor M–1 is connected to the conductors 41a and 41b by the leads 42a and 42b so that it is in continuous operation. Assuming that the toggle switch 48 is closed, the circuit to motor M will be completed upon closing of the program switch 50. When the motor M starts it will rotate the pilot shaft 102 and the cam 155 thereon will close the cycle control switch 52 and complete a holding circuit to the motor M because of its connection in parallel with the program switch 50. A cycle of operation is then begun and will be continued until completed. The switches 50 and 52 may be set to open simultaneously to stop the operation of the pilot valve P. On the other hand, it is preferred that the program switch 50 open first so that the cycle then in progress is required to continue to completion through the holding circuit maintained by the cycle control switch 52. Should the program switch 50 open in the middle of a cycle the roller 159 will then be riding on the outer surface of cam 155 and the cycle control switch 52 will remain closed. The motor M will then continue to operate until the end of the cycle is reached at which time the roller 159 will enter the notch 158, thereby permitting the switch 52 to open. This safeguard ensures that a complete cycle of operation will take place regardless of the setting of the program switch 50 and that the pilot disc 127 will not stop in a position permitting any of the valves 10 to 14 to remain open.

After installation of the system, in order to begin operation it is necessary that the unit 20 be connected to a suitable source of electrical current and that the clock be set to the proper time of the day. The clock setting can be accomplished by loosening the dial lock nut 60 and rotating the dial 37 in a clockwise direction until the correct time is shown by the pointer 63. To set the day of the week, the calendar wheel 80 is rotated counterclockwise until the correct day is indicated by the indicator 86. Pins, such as 66 and 67, are now placed in the program disc 37. A pin 67 is first placed in the inner row of holes at such time that it is desired to stop the cycle of operations. Assuming, for example, that it takes 30 minutes for motor M to rotate the pilot disc 127, one revolution and complete a cycle of operation in which each valve is opened in sequence for five minutes, one cycle would be accomplished by placing a pin 67 in the outer row of holes two holes later than the inner pin 66, that is, to allow a time period of 30 minutes. To provide repeat of the operating cycle, the pin 66 would be initially placed in the outer row in a position corresponding to multiples of the total time per cycle. For two cycles, the outer pin 66 would be placed 60 minutes later, for 10 cycles it would be placed 300 minutes later, and so on. As many of these intervals may be set up on the program disc 37 as it is desired during the day or night. For example, one operation may be from 12 noon to one o'clock providing two 30 minute cycles, another may be set to operate from 7 to 8 o'clock, p. m., another may be set to operate from 3 a. m. to 5 a. m., providing four 30 minute cycles for a period of low demand on the water main, and a still further operation may be set up to operate from 9 a. m. to 10 a. m. The control unit 20 will permit such frequent operations to be repeated, if desired, indefinitely each day of the week in a continuous manner. Should it be desired to cut out any day's operation, a pin 82a is placed in the hole of the wheel 80 opposite the day of the week desired to be omitted. Thus, any number of days of operation may be cut out as desired.

While the control system has been described with respect to control of five fluid operated valves, it will be readily apparent that the pilot valve structure may be provided with additional ports to accommodate a correspondingly greater number of valves or with fewer ports for fewer valves. Likewise, each valve could be arranged to control a plurality of distribution lines connected to a common supply line.

It will thus be seen that a compact, fully automatic, and flexible fluid distribution control apparatus has been provided whereby the distribution of fluid to a plurality of remotely located points may be accomplished in any desired repeatable time sequence beginning and ending automatically at predetermined times daily, weekly, or until purposely stopped, and that various changes in the structure may be made without departing from the principles of the invention or the scope thereof.

I claim:

1. Automatic fluid flow control apparatus for controlling fluid flow through a plurality of fluid pressure operable valves, comprising: a housing having compactly mounted therein, a small pilot valve having a rotatable pilot disc; a motor and gear train for driving said disc; means including an electric timing clock for controlling the operation of said motor, said pilot valve having a fluid supply conduit, a drain conduit, and a plurality of control conduits connected thereto and adapted to be connected to said fluid pressure operable valves, said housing also having an opening through which said conduits extend, said disc being operable by said motor to control the flow of operating fluid to actuate each of said fluid pressure operable valves in a predetermined repeatable cycle beginning and ending at predetermined times as determined by the setting of said timing clock; and means including a cam rotatable with said disc and a switch operated by said cam for disabling said motor only upon said disc reaching a predetermined position corresponding to the end of a cycle.

2. The apparatus of claim 1 wherein said motor and gear train are connected to said rotatable pilot disc by means including a drive shaft and wherein said cam rotatable with said disc is a notched cylindrical element mounted concentric with said drive shaft for rotation with said shaft.

3. In a fluid distribution system having a fluid supply conduit, a plurality of distribution conduits connected thereto, and a fluid pressure-operable valve in each distribution conduit for controlling flow of fluid thereto from said supply conduit, automatic control apparatus comprising: a pilot valve for selectively and sequentially controlling the flow of operating fluid to each of said pressure-operable valves, said pilot valve including a rotary member arranged to control the flow of operating fluid to said pressure-operable valves in predetermined sequence by rotation of said rotary member through a complete revolution, and to exhaust operating fluid from said pressure-operable valves in the same sequence at predetermined angular positions of said rotary member; drive means including an electric motor for slowly rotating said rotary member through said angular positions; time-controlled means for initiating operation of said motor at a preselected time and for maintaining said motor in operation for a preselected time interval; and means for maintaining said motor in operation to complete a revolution of said rotary member once such revolution has been initiated, including a notched cylindrical element rotatable with said rotary member and a switch having a pair of contacts in an electrical circuit to said motor and an arm which is actuated by engagement with the outer peripheral side surface of said cylindrical element to close said switch contacts and complete said electrical circuit to said motor and which arm includes a portion that is receivable in said notch to open said switch contacts and thereby break said electrical circuit at a predetermined angular position of said rotary member corresponding to the end of a revolution of said rotary member.

4. The apparatus of claim 3 wherein said switch is a microswitch in a control circuit connecting said motor to a source of electrical energy.

5. The apparatus of claim 4 wherein said control circuit connecting said motor to a source of electrical energy has parallel branches, and wherein one of said branches includes the microswitch which is controlled by cooperation between said switch-actuating arm and notched cylindrical element and the other of said branches comprises said time-controlled means and includes a microswitch controlled by an electric-timing clock.

6. The apparatus of claim 4 wherein at one angular position of the rotary member of said pilot valve all of said control conduits are in communication with said fluid supply conduit to receive pressure fluid, and at other angular positions of said rotary member during a complete revolution each of said control conduits is connected in sequence to said drain conduit, and wherein said switch-actuating arm is receivable in said notch in said cylindrical element to open said switch only at said one angular position of said rotary member wherein all of said control conduits are in communication with said fluid supply conduit.

References Cited in the file of this patent

UNITED STATES PATENTS

| | | |
|---|---|---|
| 2,360,321 | Griswold | Oct. 17, 1944 |
| 2,478,702 | Moody | Aug. 9, 1949 |
| 2,674,490 | Richards | Apr. 6, 1954 |

FOREIGN PATENTS

| | | |
|---|---|---|
| 406,260 | France | Dec. 4, 1909 |
| 744,371 | Great Britain | Feb. 8, 1956 |